United States Patent
Takahashi et al.

(10) Patent No.: US 9,209,722 B2
(45) Date of Patent: Dec. 8, 2015

(54) INVERTER CONTROL DEVICE AND INVERTER CONTROL METHOD

(71) Applicant: NISSAN MOTOR CO., LTD., Yokohama-shi, Kanagawa (JP)

(72) Inventors: Naoki Takahashi, Sagamihara (JP); Mitsuhiro Shouji, Yamato (JP); Kengo Fujiwara, Ebina (JP); Yosuke Fukunaga, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/428,671

(22) PCT Filed: Sep. 20, 2013

(86) PCT No.: PCT/JP2013/075451
§ 371 (c)(1),
(2) Date: Mar. 17, 2015

(87) PCT Pub. No.: WO2014/046235
PCT Pub. Date: Mar. 27, 2014

(65) Prior Publication Data
US 2015/0214867 A1    Jul. 30, 2015

(30) Foreign Application Priority Data

Sep. 21, 2012    (JP) .................................. 2012-208063

(51) Int. Cl.
*H02P 27/04* (2006.01)
*H02P 6/00* (2006.01)
*H02P 6/14* (2006.01)
*H02P 21/00* (2006.01)
*H02P 21/14* (2006.01)

(52) U.S. Cl.
CPC ................. *H02P 6/002* (2013.01); *H02P 6/145* (2013.01); *H02P 21/00* (2013.01); *H02P 21/0096* (2013.01); *H02P 21/146* (2013.01); *H02P 21/148* (2013.01); *H02P 27/04* (2013.01)

(58) Field of Classification Search
CPC ... H02P 21/00; H02P 21/0096; H02P 21/146; H02P 27/04; H02P 6/002
See application file for complete search history.

(56) References Cited

U.S. PATENT DOCUMENTS 4,249,212 A * 2/1981 Ito ......................... H04N 5/2625
348/579

FOREIGN PATENT DOCUMENTS

JP            06-335227 A    12/1994

* cited by examiner

*Primary Examiner* — Karen Masih
(74) *Attorney, Agent, or Firm* — Young Basile

(57) ABSTRACT

An inverter control device includes an inverter; a command value calculator; a phase compensator; an inverter controller; a d-q axes non-interference voltage command value calculator for calculating a d-q axes non-interference voltage command value to cancel out interference voltages and for outputting the d-q axes non-interference voltage command value to the command value calculator; and a reverse phase. The phase compensator calculates the amount of phase lead based on the rotation speed and a phase compensation time set in order to obtain a predetermined phase margin, and compensates for a phase based on characteristics inherent in the motor, by the amount of phase lead. The reverse phase compensator compensates for a phase of the d-q axes non-interference voltage command value by the same amount of compensation as the amount of phase lead in the opposite direction to the phase compensated for by the phase compensator.

6 Claims, 15 Drawing Sheets

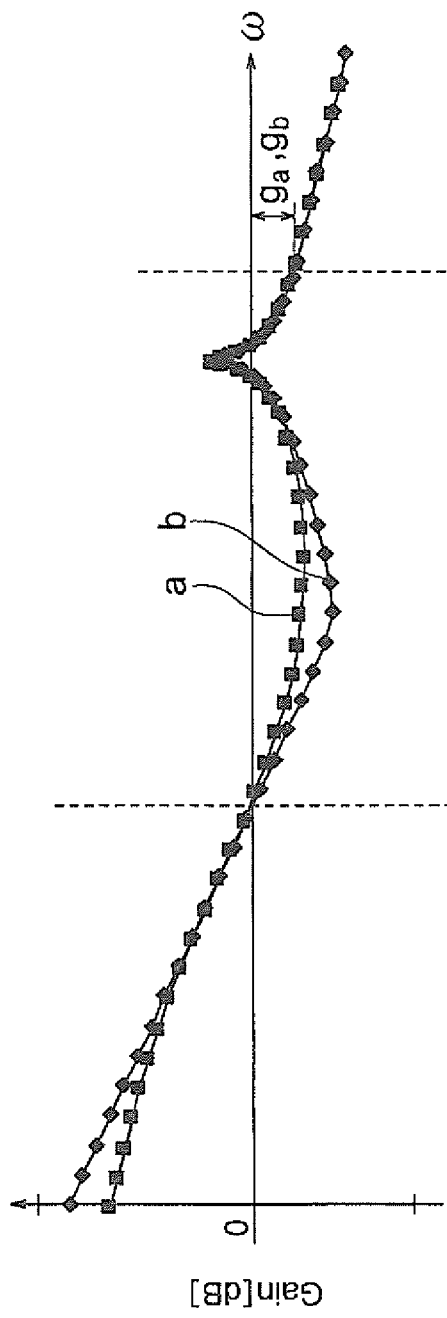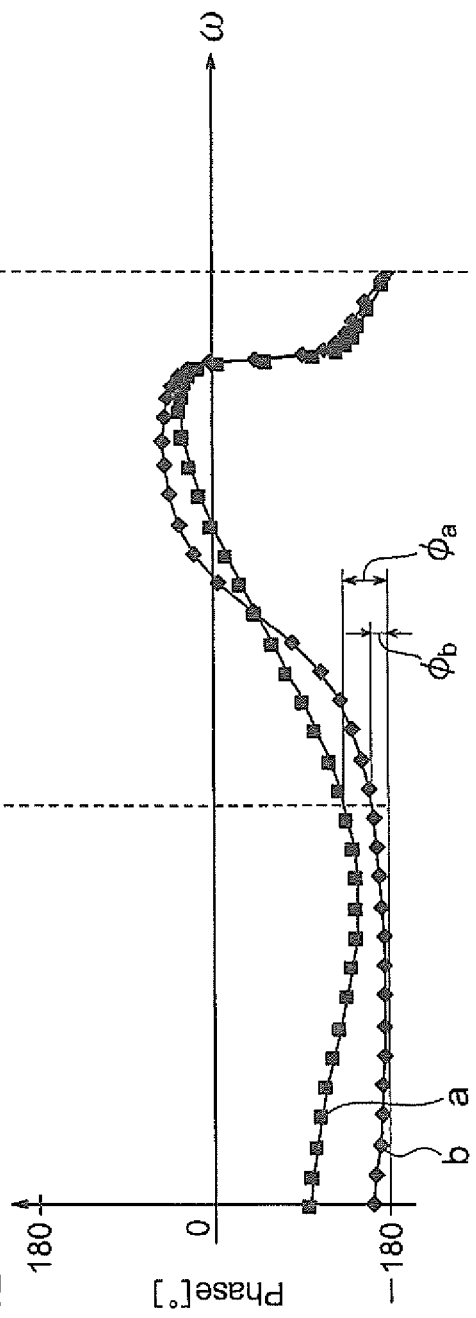
FIG. 4A
FIG. 4B

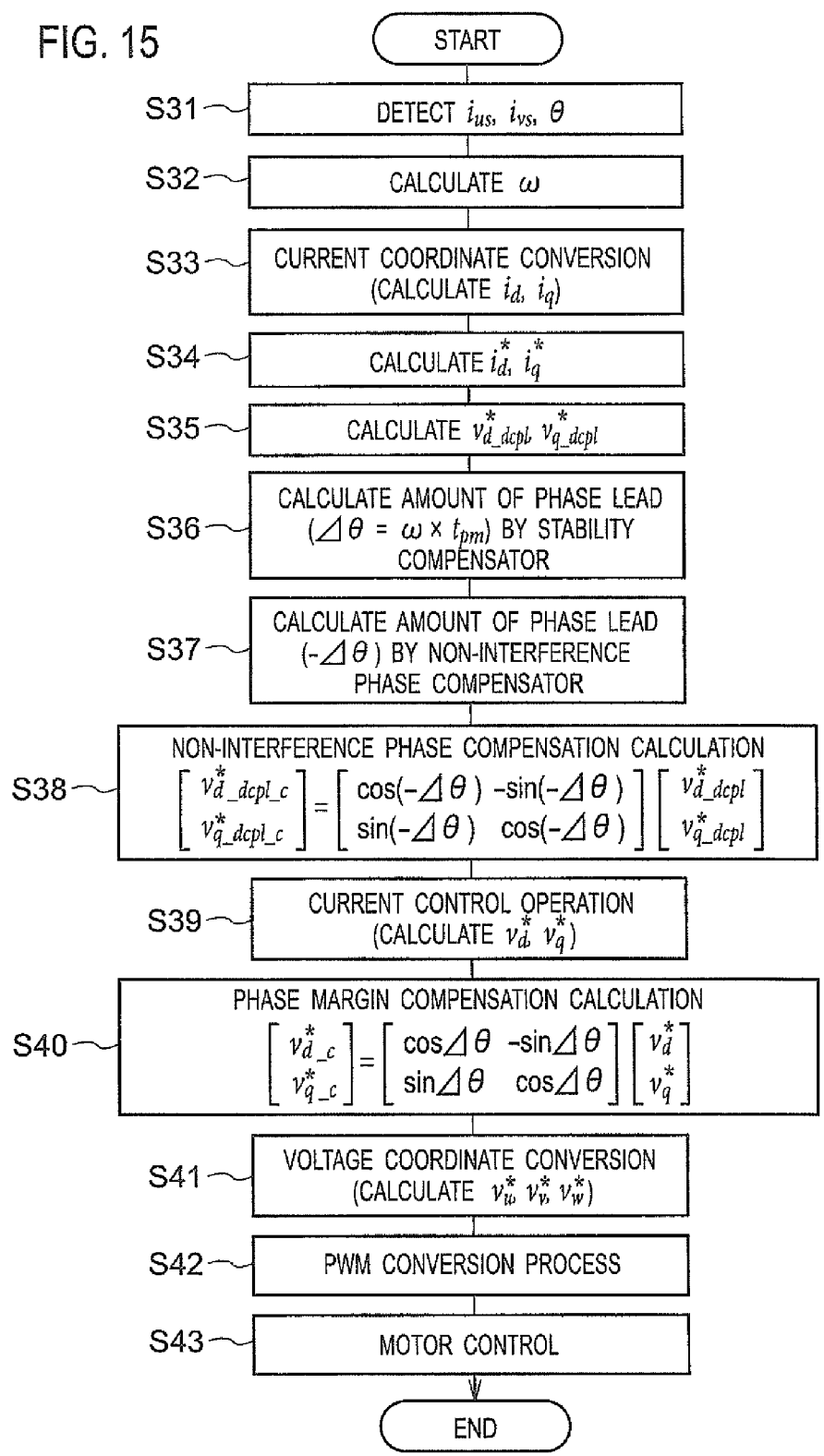

INVERTER CONTROL DEVICE AND INVERTER CONTROL METHOD

CROSS REFERENCE TO RELATED APPLICATION

The present application claims priority to Japanese Patent Application No. 2012-208063, filed Sep. 21, 2012, incorporated herein in its entirety.

TECHNICAL FIELD

The present invention relates to an inverter control device and an inverter control method.

BACKGROUND

There has been disclosed a control device for a DC motor including a power converter which supplies DC power to a DC motor; and rotating coordinate conversion means for performing a conversion from a two-phase rotation axis into a three-phase axis in order to control the power converter, the two-phase rotation axis being detected at each predetermined sampling time and having at least a rotation angle of the DC motor as a coordinate conversion angle, in which the control device is provided with first rotation angle compensating means for adding a rotation angle delayed according to the sampling time to at least the rotation angle of the DC motor detected at each predetermined sampling time, and the rotation angle resulting from the addition is set as the coordinate conversion angle.

However, the control device has the problem of rendering a control system unstable because of being unadaptable for a reduction in a phase margin due to characteristics inherent in the motor.

SUMMARY

In view of the foregoing problem, an object of the present invention is to provide an inverter control device as a stable control system and an inverter control method.

In order to solve the foregoing problem, the present invention calculates the amount of phase lead based on a phase compensation time and a rotation speed of a motor, and advances a phase based on characteristics inherent in the motor according to the amount of phase lead, and compensates for a phase of a d-q axes non-interference voltage command value by the same amount of compensation as the amount of phase lead in the opposite direction to the advanced phase.

According to the present invention, the present invention suppresses a reduction in a gain margin, while suppressing a reduction in a phase margin with respect to a change in the rotation speed of the motor, and also compensates for a phase difference between a non-interference voltage and an interference voltage, so that a control system can be stabilized.

BRIEF DESCRIPTION OF DRAWINGS

FIG. 4A is a graph illustrating gain characteristics of the inverter control device of FIG. 1 and gain characteristics of Comparative Example, and FIG. 4B is a graph illustrating phase characteristics of the inverter control device of FIG. 1 and phase characteristics of Comparative Example.

FIG. 15 is a flowchart illustrating a control procedure performed by the inverter control device of FIG. 14.

DESCRIPTION OF EMBODIMENTS

Embodiments of the present invention will be described below with reference to the drawings.

[First Embodiment]

Figure 1:
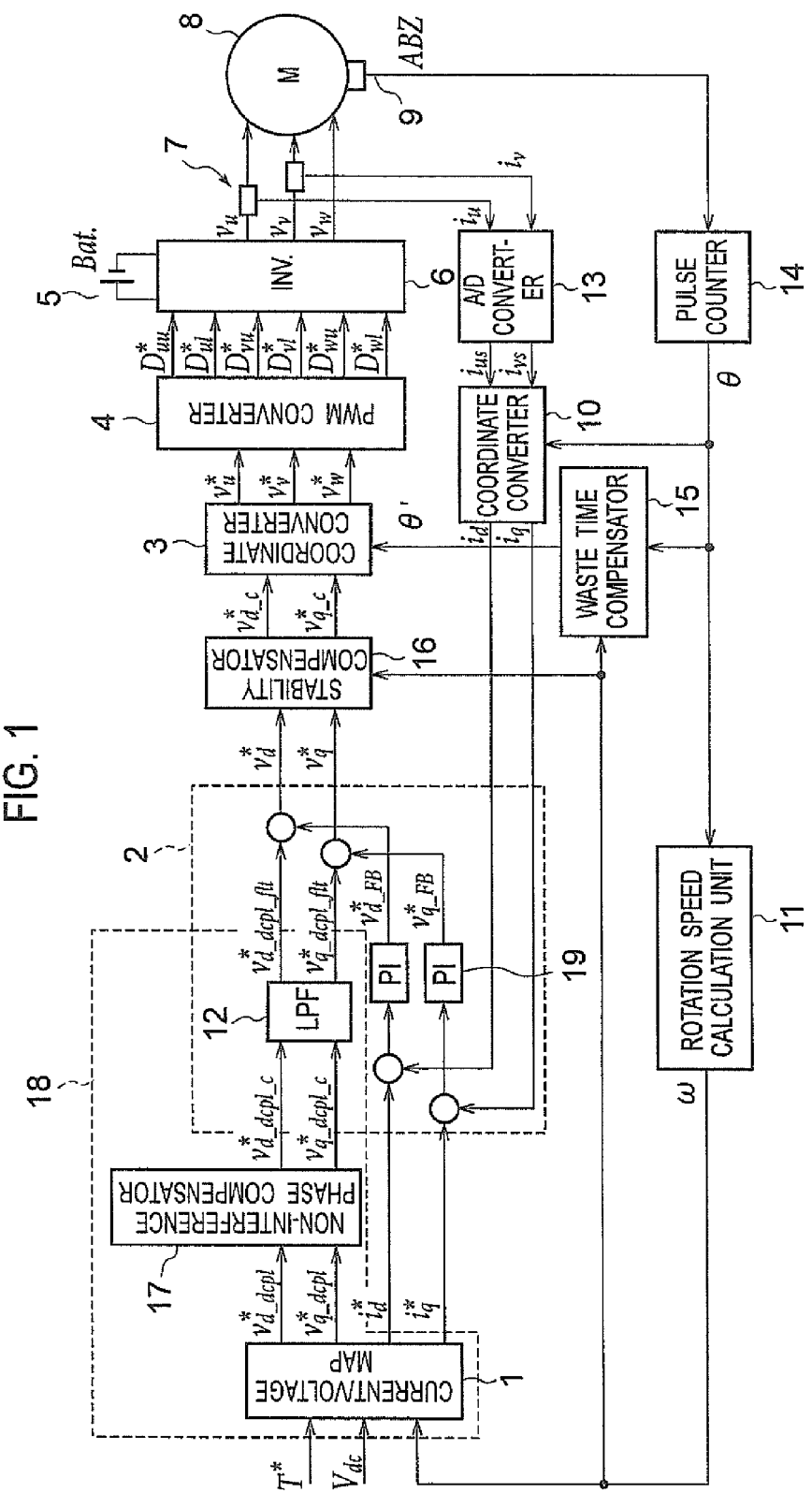
FIG. 1 is a block diagram of an inverter control device according to an embodiment of the present invention.

FIG. 1 is a block diagram of an inverter control device according to an embodiment of the present invention. Although a detailed illustration will be omitted, when an inverter control device of the embodiment is provided in an electric vehicle, a permanent magnet motor 8 of three-phase DC power is driven as a driving source for travel, and is coupled to an axle of the electric vehicle. The inverter control device of the embodiment is applicable to a vehicle other than the electric vehicle, such as a hybrid vehicle (HEV).

The inverter control device of the embodiment is configured as a control device to control operation of the motor 8, and includes a current/voltage map 1, a current controller 2, a coordinate converter 3, a PWM (Pulse Width Modulation) converter 4, a battery 5, an inverter 6, a current sensor 7, a magnetic pole position detector 9, a coordinate converter 10, a rotation speed calculation unit 11, an LPF (Low Pass Filter)

12, an A/D (analog-to-digital) converter 13, a pulse counter 14, a waste time compensator 15, a stability compensator 16, and a non-interference phase compensator 17.

The current/voltage map 1 receives inputs of a torque command value (T*) externally inputted as an output target value of the motor 8, an angular frequency (ω) as a rotation speed of the motor 8, which is outputted by the rotation speed calculation unit 11, and a voltage ($V_{dc}$) as a detection voltage of the battery 5. The current/voltage map 1 stores a map for output of a d-q axes current command value ($i^*_d$, $i^*_q$) and a d-q axes non-interference voltage command value ($V^*_{d\_dcpl}$, $V^*_{q\_dcpl}$), using the torque command value (T*), the angular frequency (ω), and the voltage ($V_{dc}$) as indexes. By referring to the map, the current/voltage map 1 calculates and outputs the d-q axes current command value ($i^*_d$, $i^*_q$) and the d-q axes non-interference voltage command value ($V^*_{d\_dcpl}$, $V^*_{q\_dcpl}$) corresponding to the inputs of the torque command value (T*), the angular frequency (ω), and the voltage ($V^*_{dc}$). As employed herein, the term "d-q axes" indicates components of a rotating coordinate system. As for the d-q axes non-interference voltage command value ($V_{d\_dcpl}$, $V^*_{q\_dcpl}$), when a current flows through the d axis and the q axis, interference voltages interfering with each other are generated on the d and q axes, and the d-q axes non-interference voltage command value ($V^*_{d\_dcpl}$, $V^*_{q\_dcpl}$) is a voltage for canceling out the interference voltages. The d-q axes non-interference voltage command value is calculated from the angular frequency (ω), d-q axes inductance ($L_d$, $L_q$) and d-q axes current ($i_d$, $i_q$). The d-q axes non-interference voltage command value ($V^*_{d\_dcpl}$, $V^*_{q\_dcpl}$) is outputted to the non-interference phase compensator 17.

The non-interference phase compensator 17 compensates for a phase of the d-q axes non-interference voltage command value ($V^*_{d\_dcpl}$, $V^*_{q\_dcpl}$) according to the amount of phase compensation compensated for by the stability compensator 16 to be described later, thereby to compensate for a phase difference between the interference voltages between the d and q axes and a d-q axes non-interference voltage. A detailed configuration and the like of the non-interference phase compensator 17 will be described later.

Also, a non-interference voltage control unit 18 is formed of the current/voltage map 1, the LPF 12, and the non-interference phase compensator 17.

The current controller 2 receives inputs of the d-q axes current command value ($i^*_d$, $i^*_q$), a post-compensation d-q axes non-interference voltage command value ($V^*_{d\_dcpl\_c}$, $V^*_{q\_dcpl\_c}$), and the d-q axes current ($i_d$, $i_q$), performs control operations using the inputs, and outputs a d-q axes voltage command value ($V^*_d$, $V^*_q$) to the stability compensator 16. The current controller 2 includes the low pass filter (LPF) 12, a PI controller 19, and an adder.

The LPF 12 receives an input of the post-compensation d-q axes non-interference voltage command value ($V^*_{d\_dcpl\_c}$, $V^*_{q\_dcpl\_c}$) compensated for by the non-interference phase compensator 17, cuts off a high-frequency band according to the input, and outputs a voltage command value ($V^*_{d\_dcpl\_flt}$, $V^*_{q\_dcpl\_flt}$).

The PI controller 19 calculates a d-q axes follow-up voltage command value ($V^*_{d\_FB}$, $V^*_{q\_FB}$) to match the d-q axes current ($i_d$, $i_q$) based on a detection current from the current sensor 7 to the d-q axes current command value ($i^*_d$, $i^*_q$). The PI controller 19 is a controller which performs proportional and integral operations (or PI (proportional-plus-integral) control operations) based on a deviation of the d-q axes current ($i_d$, $i_q$) from the d-q axes current command value ($i^*_d$, $i^*_q$) thereby to perform feedback control to feed back the d-q axes current ($i_d$, $i_q$) into the current controller 2 and thus cause the d-q axes current to follow the d-q axes current command value ($i^*_d$, $i^*_q$).

The adder provided between the LPF 12 and the stability compensator 16 and between the PI controller 19 and the stability compensator 16 adds the voltage command value ($V^*_{d\_dcpl\_flt}$, $V^*_{q\_dcpl\_flt}$) and the d-q axes follow-up voltage command value ($V^*_{d\_FB}$, $V_{q\_FB}$) thereby to calculate the d-q axes voltage command value ($V^*_d$, $V^*_q$), and outputs the d-q axes voltage command value ($V^*_d$, $V^*_q$) to the stability compensator 16.

The stability compensator 16 compensates for the d-q axes voltage command value ($V^*_d$, $V^*_q$) based on the angular frequency (ω), and outputs the post-compensation d-q axes voltage command value ($V^*_{d\_c}$, $V^*_{q\_c}$) to the coordinate converter 3. Details of the stability compensator 16 will be described later.

The coordinate converter 3 receives inputs of the post-compensation d-q axes voltage command value ($V^*_{d\_c}$, $V^*_{q\_c}$) from the stability compensator 16 and the amount of phase (θ') outputted from the waste time compensator 15, and uses Equation (1) to convert the post-compensation d-q axes voltage command value ($V^*_{d\_c}$, $V^*_{q\_c}$) of the rotating coordinate system into a u-v-w axes voltage command value ($V^*_u$, $V^*_v$, $V^*_w$) of a fixed coordinate system.

$$\begin{bmatrix} v^*_u \\ v^*_v \\ v^*_w \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta' & -\sin\theta' \\ \sin\theta' & \cos\theta' \end{bmatrix} \begin{bmatrix} v^*_{d\_c} \\ v^*_{q\_c} \end{bmatrix} \quad (1)$$

The PWM converter 4 generates a driving signal ($D^*_{uu}$, $D^*_{ul}$, $D^*_{vu}$, $D^*_{vl}$, $D^*_{wu}$, $D^*_{wl}$) for a switching element of the inverter 6, based on the inputted voltage command value ($V^*_u$, $V^*_v$, $V^*_w$), and outputs the driving signal to the inverter 6. The switching element is switched on and off based on a PWM pulse signal.

The battery 5 is a DC power supply including a secondary battery, and serves as a power source of the vehicle of the embodiment. The inverter 6 is formed of a three-phase inverter circuit having a connection of plural circuits each having switching elements (not illustrated) such as MOSFETs (Metal Oxide Semiconductor Field Effect Transistors) or IGBTs (Insulated Gate Bipolar Transistors), connected in pairs. Each switching element receives an input of the driving signal ($D^*_{uu}$, $D^*_{ul}$, $D^*_{vu}$, $D^*_{vl}$, $D^*_{wu}$, $D^*_{wl}$). Then, the switching element performs switching operation thereby to convert a DC voltage of the DC power supply into an AC voltage ($V_u$, $V_v$, $V_w$), which is then inputted to the motor 8. Also, when the motor 8 operates as a generator, the inverter 6 converts the AC voltage outputted from the motor 8 into a DC voltage, and outputs the DC voltage to the battery 5. Thereby, the battery 5 is charged.

The current sensor 7 is provided in each of U and V phases, and detects a phase current ($i_u$, $i_v$) and outputs the phase current ($i_u$, $i_v$) to the A/D converter 13. The A/D converter 13 samples the phase current ($i_u$, $i_v$) and outputs the sampled phase current ($i_{us}$, $i_{vs}$) to the coordinate converter 10. A w-phase current is not detected by the current sensor 7, and instead, the coordinate converter 10 uses Equation (2) to calculate a w-phase phase current ($i_{ws}$) based on the inputted phase current ($i_{us}$, $i_{vs}$).

$$i_{ws} = -i_{us} - i_{vs} \quad (2)$$

For the w-phase phase current, the current sensor 7 may be provided in a w phase to detect the w-phase phase current.

The motor 8 is a polyphase motor and is connected to the inverter 6. The motor 8 also operates as the generator. The magnetic pole position detector 9 is provided in the motor 8, and serves as a detector to detect the position of a magnetic pole of the motor 8 and outputs A-, B- and Z-phase pulses to the pulse counter 14 according to the position of the magnetic pole. The pulse counter 14 counts the pulses outputted from the magnetic pole position detector 9 thereby to obtain a detection value (θ) as position information on a rotor of the motor 8, and outputs the detection value (θ) to the rotation speed calculation unit 11. The rotation speed calculation unit 11 calculates the angular frequency (ω) of the motor 8 from the detection value (θ) from the magnetic pole position detector 9.

The coordinate converter 10 serves as a control unit to perform three-phase to two-phase conversion, and receives inputs of the phase current ($i_{us}$, $i_{vs}$, $i_{ws}$) and the detection value (θ) from the pulse counter 14 and uses Equation (3) to convert the phase current ($i_{us}$, $i_{vs}$, $i_{ws}$) of the fixed coordinate system into the d-q axes current ($i_d$, $i_q$) of the rotating coordinate system.

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_{us} \\ i_{vs} \\ i_{ws} \end{bmatrix} \quad (3)$$

Then, the d-q axes current ($i_d$, $i_q$) is inputted to the current controller 2, and thereby, the inverter control device of the embodiment performs control using a current control loop.

The waste time compensator 15 compensates for a voltage output delay between the determination of the voltage command value ($V^*_u$, $V^*_v$, $V^*_w$) and the application of the AC voltage ($V_u$, $V_v$, $V_w$) to the motor 8, a delay due to a waste time caused by zero-order sample hold in the current sensor 7 and the A/D converter 13, and a delay caused by a noise-cut filter, and the like, and receives inputs of the detection value (θ) and the angular frequency (ω) and outputs the amount of phase (θ') to the coordinate converter 3.

Figure 2:
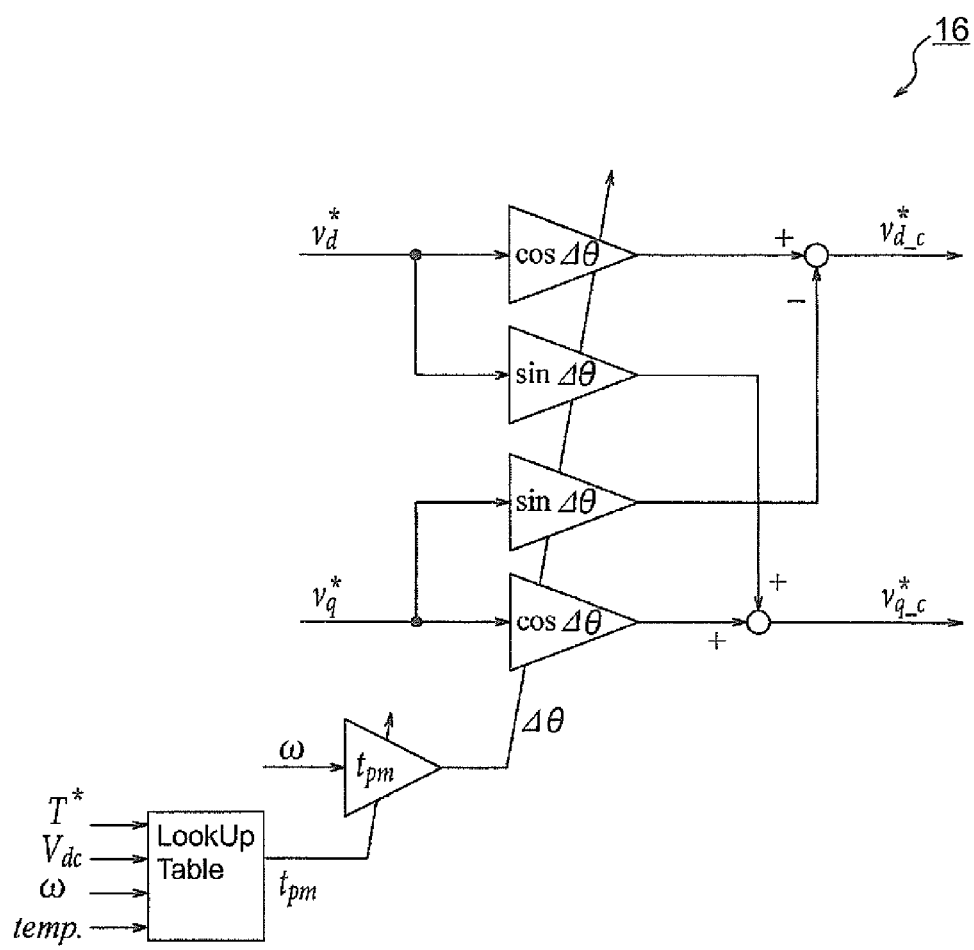
FIG. 2 is a block diagram of a stability compensator.

Next, a detailed configuration of the stability compensator 16 will be described with reference to FIG. 2. FIG. 2 is a block diagram of the stability compensator 16. The stability compensator 16 utilizes rotating coordinate conversion in rectangular coordinates to calculate the post-compensation d-q axes voltage command value ($V^*_{d\_c}$, $V^*_{q\_c}$) from the d-q axes voltage command value ($V^*_d$, $V^*_q$). Specifically, the post-compensation d-axis voltage command value ($V^*_{d\_c}$) is calculated by subtracting the q-axis voltage command value ($V^*_q$) multiplied by sin (Δθ) from the d-axis voltage command value ($V^*_d$) multiplied by cos (Δθ), and the post-compensation q-axis voltage command value ($V^*_{q\_c}$) is calculated by adding the q-axis voltage command value ($V^*_q$) multiplied by cos (Δθ) and the d-axis voltage command value ($V^*_d$) multiplied by sin (Δθ).

The amount of lead (Δθ) of a phase rotated by the stability compensator 16 performing the rotating coordinate conversion is calculated from a phase compensation time ($t_{pm}$) and the angular frequency (ω). The phase compensation time ($t_{pm}$) is a value determined based on characteristics inherent in the motor 8 and is a preset value. In the embodiment, a lookup table which associates the externally inputted torque command value (T*), the detection voltage ($V_{dc}$) of the battery 5, the rotation speed (ω) of the motor 8, and a temperature of the motor with the phase compensation time ($t_{pm}$) is stored.

Then, inputs of the externally inputted torque command value (T*), the detection voltage ($V_{dc}$) of the battery 5, the rotation speed (ω) of the motor 8, and the temperature of the motor are received, and the phase compensation time ($t_{pm}$) is calculated by referring to the table. Further, the amount of phase lead (Δθ) is calculated by taking a product of the angular frequency (ω) and the phase compensation time ($t_{pm}$) as an output value from the table.

Thereby, the voltage command value is compensated for by the amount of phase lead (Δθ) so as to advance the phase in a rotation direction of the motor 8 without changing the magnitude of a voltage command value vector formed of the d-axis voltage command value ($V^*_d$) as a voltage command value in a magnetic pole direction and the q-axis voltage command value ($V^*_q$) as a voltage command value in a direction orthogonal to the magnetic pole.

Figure 3:
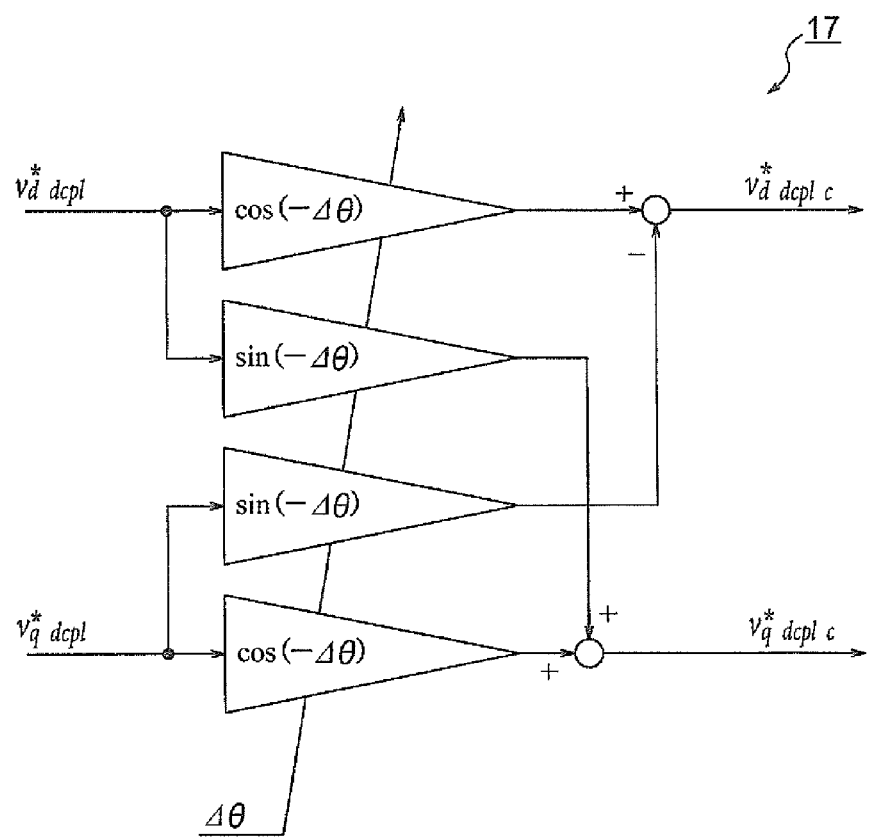
FIG. 3 is a block diagram of a non-interference phase compensator.

Next, the detailed configuration of the non-interference phase compensator 17 will be described with reference to FIG. 3. FIG. 3 is a block diagram of the non-interference phase compensator 17. The non-interference phase compensator 17 utilizes the rotating coordinate conversion in the rectangular coordinates to calculate the post-compensation d-q axes non-interference voltage command value ($V^*_{d\_dcpl\_c}$, $V^*_{q\_dcpl\_c}$) from the d-q axes non-interference voltage command value ($V^*_{d\_dcpl}$, $V^*_{q\_dcpl}$). Specifically, the post-compensation d-axis non-interference voltage command value ($V^*_{d\_dcpl\_c}$) is calculated by subtracting the q-axis non-interference voltage command value ($V^*_{q\_dcpl}$) multiplied by sin (Δθ) from the d-axis non-interference voltage command value ($V^*_{d\_dcpl}$) multiplied by cos (Δθ), and the post-compensation q-axis non-interference voltage command value ($V^*_{q\_dcpl\_c}$) is calculated by adding the q-axis non-interference voltage command value ($V^*_{q\_dcpl}$) multiplied by cos (Δθ) and the d-axis non-interference voltage command value ($V^*_{d\_dcpl}$) multiplied by sin (Δθ). Thereby, the non-interference phase compensator 17 sets the rotating phase to (−Δθ) to perform the rotating coordinate conversion of the d-q axes non-interference voltage command value ($V^*_{d\_dcpl}$, $V^*_{q\_dcpl}$) in the opposite direction to a rotation direction of the rotating coordinate conversion by the stability compensator 16 and calculate the post-compensation d-q axes non-interference voltage command value ($V^*_{d\_dcpl\_c}$, $V^*_{q\_dcpl\_c}$).

The amount of lead (−Δθ) of a phase rotated by the non-interference phase compensator 17 performing the rotating coordinate conversion is the same amount of compensation as the amount of phase lead (Δθ) as the amount of compensation by the stability compensator 16, and is in the opposite direction to the rotation direction of the amount of phase lead (Δθ). Thus, the amount of phase compensation by the non-interference phase compensator 17 is calculated from the phase compensation time ($t_{pm}$) and the angular frequency (ω) in the same manner as the amount of compensation by the stability compensator 16. Thereby, the non-interference phase compensator 17 is configured to cancel the phase compensation by the stability compensator 16.

Description will now be given with reference to FIGS. 4A and 4B with regard to a relationship between the phase compensation time ($t_{pm}$) and phase and gain margins in a control system of the inverter control device of the embodiment. FIGS. 4A and 4B illustrate a loop transfer characteristic Bode diagram in a current control system of the inverter control device, and FIG. 4A illustrates gain characteristics relative to the angular frequency, and FIG. 4B illustrates phase characteristics relative to the angular frequency. In FIGS. 4A and 4B, FIG. 4A illustrates characteristics of the present invention, and FIG. 4B illustrates characteristics of Comparative Example in which the phase compensation time ($t_{pm}$) is not set.

A gain curve illustrates as the phase margin a difference from a phase of −180° at a frequency (or a gain intersection) less than 0 (dB), and a phase curve illustrates as the gain margin a difference from a gain of 0 (dB) at a frequency (or a gain intersection) less than −180°. As illustrated in FIG. 4A, $g_a$ represents the gain characteristics of the embodiment; and $g_b$, represents the gain characteristics of Comparative Example, and as illustrated in FIG. 4B, $\phi_a$ represents the phase characteristics of the embodiment; and $\phi_b$, represents the phase characteristics of Comparative Example.

As illustrated in FIG. 4B, in Comparative Example, the phase margin ($\phi_b$) is insufficient and thus the control system is unstable, whereas in the embodiment, a sufficient phase margin ($\phi_a$) is obtained and thus the control system is stable. Also, as illustrated in FIG. 4A, the gain margins ($g_a$, $g_b$) of the embodiment and Comparative Example have substantially the same value. As illustrated in the graph of Comparative Example, a reduction in the phase margin occurs in a low-frequency region, and, as for such a reduction in the phase margin, suppression of the reduction in the phase margin in the low-frequency region is not possible with a method in which compensation is made by expecting the position of a rotor which advances to a value at which a time corresponding to a waste time elapses, as disclosed in Japanese Patent Application Publication No. Hei 6-335227. In the embodiment, it can be observed that the reduction in the phase margin in the low-frequency region is caused by the characteristics inherent in the motor 8, and thus, in the embodiment, a compensation coefficient based on the characteristics inherent in the motor 8 is set as the phase compensation time ($t_{pm}$) thereby to compensate for the phase of d-q axes current command value, based on the phase compensation time ($t_{pm}$). Thereby, the embodiment can suppress the reduction in the phase margin in the low-frequency region, while preventing a reduction in the phase margin in a high-frequency region.

Figure 5B:
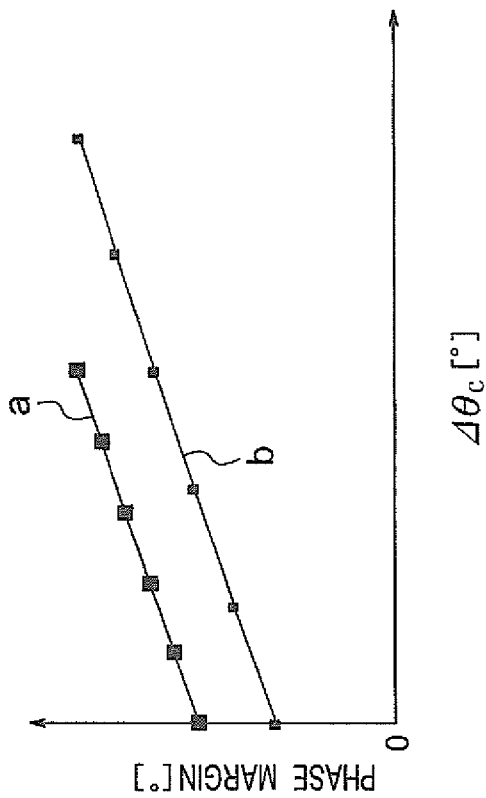
FIG. 5B is a graph illustrating characteristics of the phase margin relative to ($\Delta\theta c$), in the inverter control device of FIG. 1.
Figure 5A:
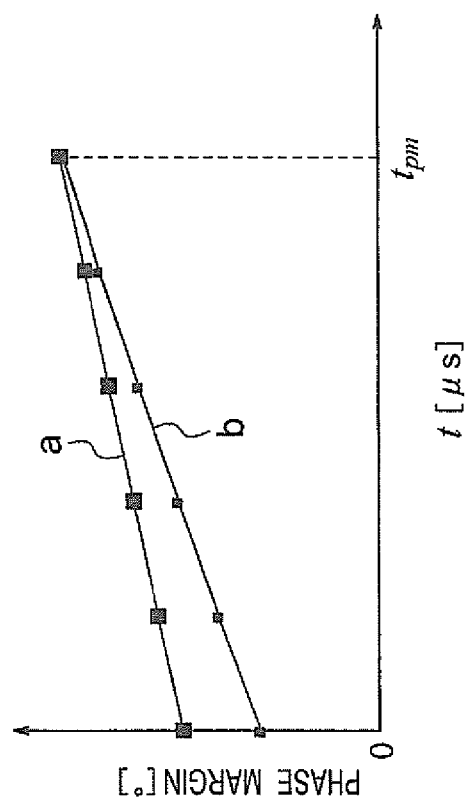
FIG. 5A is a graph illustrating characteristics of a phase margin relative to the phase compensation time ($t_{pm}$)

Next, description will be given with regard to the embodiment in which the product of the phase compensation time ($t_{pm}$) as a parameter of a unit of time and the angular frequency ($\omega$) is taken to calculate the amount of phase lead ($\Delta\theta$). FIG. 5A illustrates characteristics of the phase margin relative to the phase compensation time (t), and FIG. 5B illustrates characteristics of the phase margin relative to $\Delta\theta c$. Also, FIG. 5A illustrates characteristics of an angular frequency ($\omega_1$), and FIG. 5B illustrates characteristics of an angular frequency ($\omega_2$) higher than the angular frequency ($\omega_1$). The characteristics of FIG. 5A are the characteristics of the phase margin taken under a condition where the phase compensation time (t) is set and the amount of phase lead ($\Delta\theta$) is calculated by taking the product of the phase compensation time (t) and the angular frequency ($\omega$) of the motor 8, in the same manner as the present invention, and the phase compensation time (t) is set as the parameter. Meanwhile, the characteristics of FIG. 5B are the characteristics of the phase margin taken under a condition where the amount of phase lead ($\Delta\theta c$) in itself is set as the parameter, and thus, the amount of phase lead ($\Delta\theta c$) does not contain a factor of the detected angular frequency ($\omega$) of the motor 8, and FIG. 5B is given as Comparative Example.

As illustrated in FIG. 5B, when the amount of phase lead ($\Delta\theta c$) is set as the parameter, the phase margin has a different value if the angular frequency is different. Meanwhile, as illustrated in FIG. 5A, when the phase compensation time (t) is set as the parameter, the phase compensation time (t) is set to $t_{pm}$, and thereby, the phase margin has substantially the same value even if the angular frequency is different. Thus, in the embodiment, the phase compensation time ($t_{pm}$) as the unit of time is set as the parameter for determination of stability of the control system, and the product of the phase compensation time ($t_{pm}$) and the angular frequency ($\omega$) is taken to calculate the amount of phase lead ($\Delta\theta$), and thereby, the phase margin can be maintained high with stability with respect to the rotation speed of the motor 8.

Next, description will be given with regard to compensation of the phase difference between the interference voltage and the non-interference voltage by the non-interference phase compensator 17.

As described above, the current controller 2 performs calculations including the use of the d-q axes non-interference voltage thereby to calculate the d-q axes voltage command value ($V^*_d$, $V^*_q$), and the stability compensator 16 compensates for the phase of the d-q axes voltage command value ($V^*_d$, $V^*_q$) so as to advance the phase thereof, thereby suppressing a reduction in the phase margin based on the characteristics inherent in the motor 8.

Also, in the embodiment, the inverter is controlled by the feedback control of the d-q axes current ($i_d$, $i_q$), using the non-interference voltage, while the waste time compensator 15 and the stability compensator 16 perform phase compensation in order to stabilize response characteristics. The waste time compensator 15 compensates for a delay in an output voltage and an equivalent delay in the waste time caused by the output voltage being subjected to the zero-order sample hold.

Here, in non-interference control of the embodiment, when the waste time or the like occurs by the current sensor 7 performing averaging operation or the like for current detection, the actual interference voltage and the non-interference voltage command value ($V^*_{d\_dcpl}$, $V^*_{q\_dcpl}$) are affected by the phase compensation performed by the stability compensator 16, and a phase difference arises between the actual interference voltage and the non-interference voltage command value ($V^*_{d\_dcpl}$, $V^*_{q\_dcpl}$). In the embodiment, therefore, deterioration in current response is prevented by compensating for the phase difference arising between the non-interference voltage and the interference voltage, while compensating for the phase based on the characteristics inherent in the motor.

The phase difference arising between the non-interference voltage and the interference voltage is caused by the phase compensation performed by the stability compensator 16, and the stability compensator 16 compensates for the d-q axes voltage command value ($V^*_d$, $V^*_q$) by the amount of phase lead ($\Delta\theta$). The d-q axes voltage command value ($V^*_d$, $V^*_q$) is a value calculated based on the non-interference voltage and a voltage command value for feedback (or an FB voltage command value) including an interference voltage component, and the phase difference arises between the non-interference voltage and the voltage command value (or the FB voltage command value). In the embodiment, therefore, the non-interference phase compensator 17 compensates for the phase of the non-interference voltage command value by the amount of compensation having the same magnitude as the amount of phase lead ($\Delta\theta$) in the opposite direction to the amount of phase lead ($\Delta\theta$). In other words, the non-interference phase compensator 17 compensates for the phase of the non-interference voltage command value in the opposite direction to the phase compensated for by the stability compensator 16, and an absolute value (or a scalar) of the phase compensation by the non-interference phase compensator 17 is set equal to an absolute value (or a scalar) of the phase compensation by the stability compensator 16.

Further, in other words, the stability compensator 16 rotates a vector of the d-q axes voltage command value ($V^*_d$, $V^*_q$) by the amount of compensation of an angle of phase lead ($\Delta\theta$), and the non-interference phase compensator rotates a vector of the d-q axes non-interference voltage command value ($V^*_{d\_dcpl}$, $V^*_{q\_dcpl}$) by the amount of compensation of the angle of phase lead ($\Delta\theta$) in the opposite direction to rotation of the stability compensator 16.

Figure 6A:
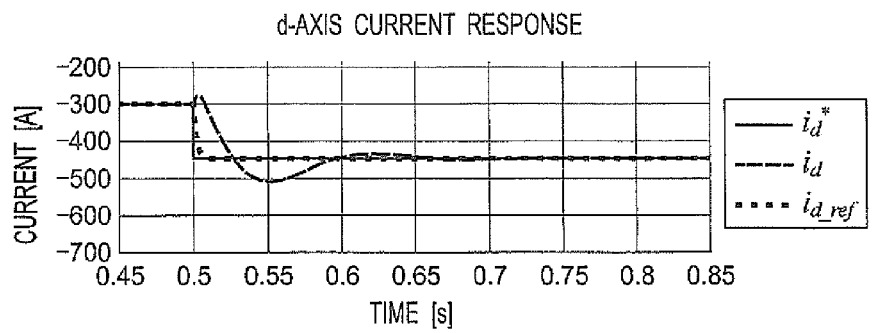
FIG. 6A is a graph illustrating d-axis current characteristics relative to time of Reference Example.
Figure 6B:
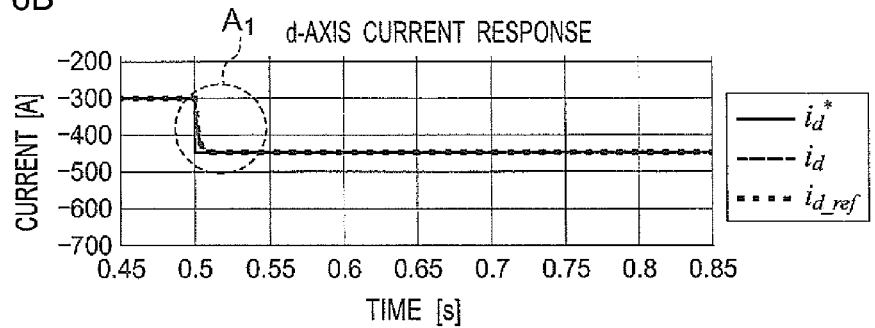
FIG. 6B is a graph illustrating d-axis current characteristics relative to time of the present invention.
Figure 6C:
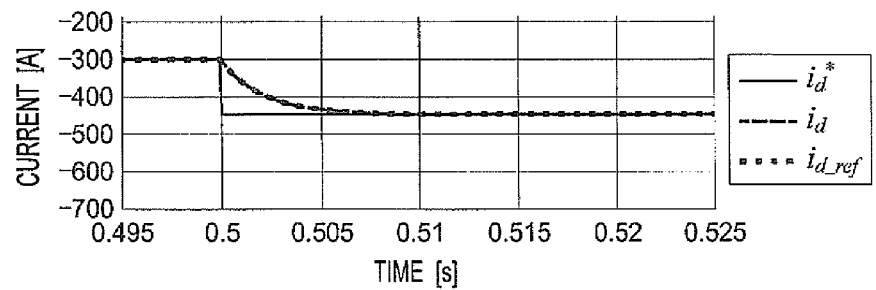
FIG. 6C is a graph illustrating d-axis current characteristics relative to time of the present invention, in the inverter control device of FIG. 1.

Description will be given with reference to FIGS. 6 to 9 with regard to response characteristics with respect to stepped torque at high-speed rotation (e.g. 10000 rpm) in the current control system of the embodiment. FIGS. 6A-6C are graphs illustrating response characteristics of a d-axis current, and FIG. 6A is a graph of current characteristics of Reference Example, FIG. 6B is a graph of current characteristics of the present invention, and FIG. 6C is a graph illustrating in enlarged dimension a portion circled by circle $A_1$ in FIG. 6B. In FIGS. 6A-6C, $i_{d^*}$ represents a d-axis current command value; $i_d$, the d-axis current (or the actual d-axis current); and $i_{d\_ref^*}$, model response characteristics. Also, Reference Example illustrates response characteristics of a control system without the phase compensation being performed by the non-interference phase compensator 17, in the current control system of FIG. 1.

As illustrated in FIG. 6A, in Reference Example, the non-interference voltage and the interference voltage do not coincide with each other due to being affected by the phase compensation performed by the stability compensator 16, and thus the d-axis current ($i_d$) causes a reverse reaction to the d-axis current command value and further causes an overshoot. In Reference Example, therefore, there is a deterioration in the response characteristics of the d-axis current with respect to input torque.

Meanwhile, as illustrated in FIGS. 6B and 6C, in the embodiment, the non-interference phase compensator 17 compensates for the influence of the phase compensation by the stability compensator 16 to thus eliminate the phase difference between the non-interference voltage and the interference voltage, so that the d-axis current coincides with model response. Thereby, the embodiment can prevent the deterioration in the response characteristics of the d-axis current as observed in Reference Example.

Figure 7A:
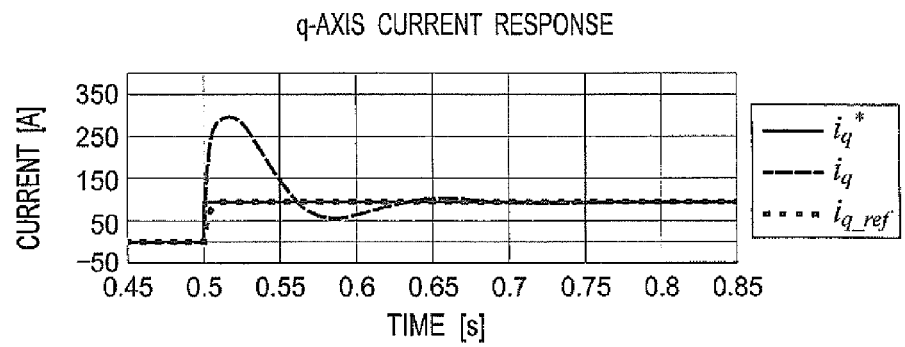
FIG. 7A is a graph illustrating q-axis current characteristics relative to time of Reference Example.
Figure 7B:
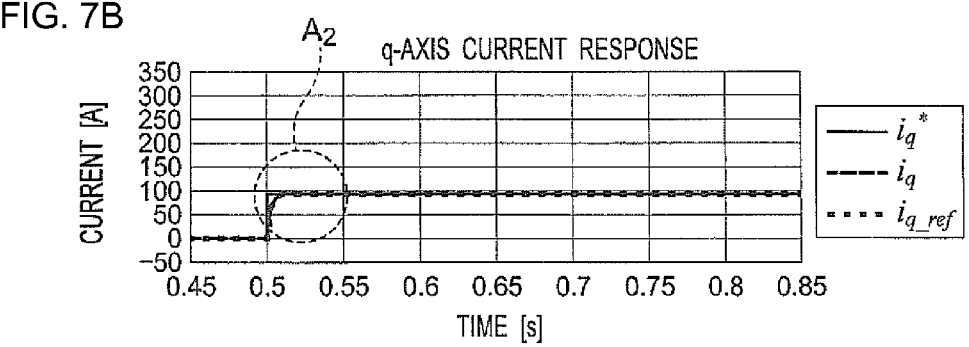
FIG. 7B is a graph illustrating q-axis current characteristics relative to time of the present invention.
Figure 7C:
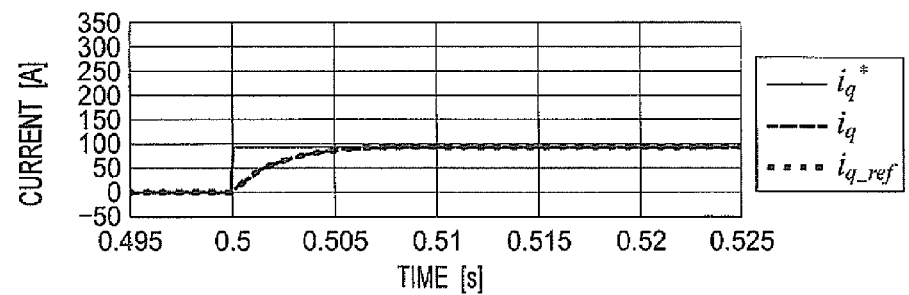
FIG. 7C is a graph illustrating q-axis current characteristics relative to time of the present invention, in the inverter control device of FIG. 1.

FIGS. 7A-7C are graphs illustrating response characteristics of a q-axis current, and FIG. 7A is a graph of current characteristics of Reference Example, FIG. 7B is a graph of current characteristics of the present invention, and FIG. 7C is a graph illustrating in enlarged dimension a portion circled by circle $A_2$ in FIG. 7B. In FIGS. 7A-7C, $i_{e}$ represents a q-axis current command value; $i_q$, the q-axis current (or the actual q-axis current); and $i_{q\_ref^*}$, model response characteristics. Also, Reference Example illustrates response characteristics of a control system without the phase compensation being performed by the non-interference phase compensator 17, in the current control system of FIG. 1.

As illustrated in FIG. 7A, in Reference Example, the non-interference voltage and the interference voltage do not coincide with each other due to being affected by the phase compensation performed by the stability compensator 16, and thus the q-axis current ($i_q$) causes an overshoot with respect to the q-axis current command value and further causes a reverse reaction thereto. In Reference Example, therefore, there is a deterioration in the response characteristics of the q-axis current with respect to input torque.

Meanwhile, as illustrated in FIGS. 7B and 7C, in the embodiment, the non-interference phase compensator 17 compensates for the influence of the phase compensation by the stability compensator 16 to thus eliminate the phase difference between the non-interference voltage and the interference voltage, so that the q-axis current coincides with model response. Thereby, the embodiment can prevent the deterioration in the response characteristics of the q-axis current as observed in Reference Example.

Figure 8A:
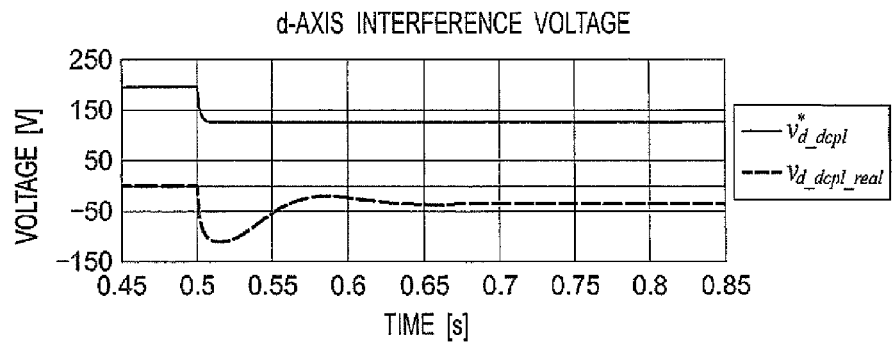
FIG. 8A is a graph illustrating d-axis voltage characteristics relative to time of Reference Example.
Figure 8B:
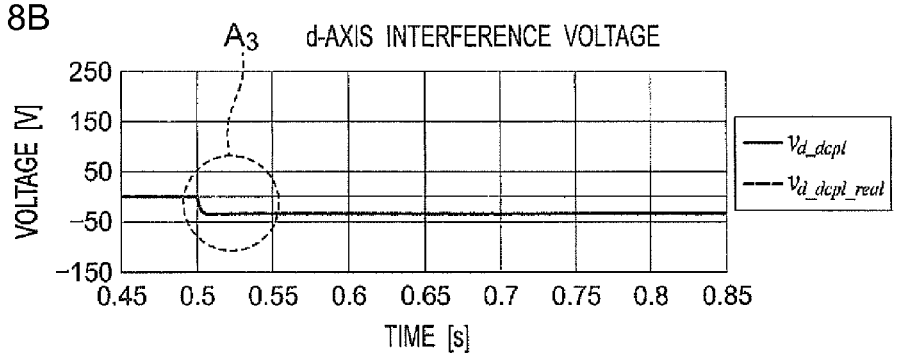
FIG. 8B is a graph illustrating d-axis voltage characteristics relative to time of the present invention.
Figure 8C:
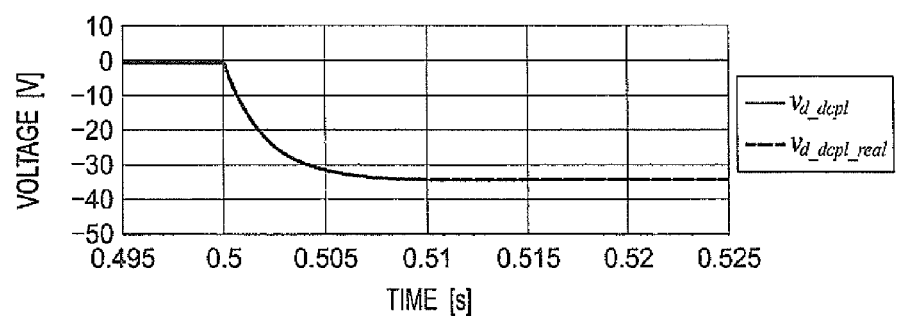
FIG. 8C is a graph illustrating d-axis voltage characteristics relative to time of the present invention, in the inverter control device of FIG. 1.

FIGS. 8A-8C are graphs illustrating response characteristics of a d-axis voltage, and FIG. 8A is a graph of current characteristics of Reference Example, FIG. 8B is a graph of current characteristics of the present invention, and FIG. 8C is a graph illustrating in enlarged dimension a portion circled by circle $A_3$ in FIG. 8B. In FIGS. 8A-8C, $V^*_{d\_dcpl}$ represents a d-axis non-interference voltage; and $V^*_{d\_dcpl\_real}$, the actual interference voltage. Also, Reference Example illustrates response characteristics of a control system without the phase compensation being performed by the non-interference phase compensator 17, in the current control system of FIG. 1.

As illustrated in FIG. 8A, in Reference Example, the non-interference voltage and the actual interference voltage do not coincide with each other due to being affected by the phase compensation performed by the stability compensator 16, and thus a stationary error occurs between the d-axis non-interference voltage and the d-axis interference voltage.

Meanwhile, as illustrated in FIGS. 8B and 8C, in the embodiment, the non-interference phase compensator 17 compensates for the influence of the phase compensation by the stability compensator 16 to thus eliminate the phase difference between the non-interference voltage and the interference voltage, and there is no error between the d-axis non-interference voltage and the d-axis interference voltage, so that the d-axis interference voltage coincides with the d-axis non-interference voltage.

Figure 9A:
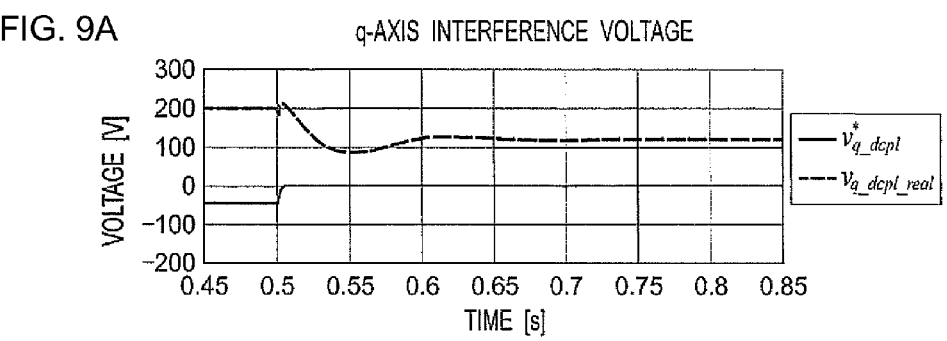
FIG. 9A is a graph illustrating q-axis voltage characteristics relative to time of Reference Example.
Figure 9B:
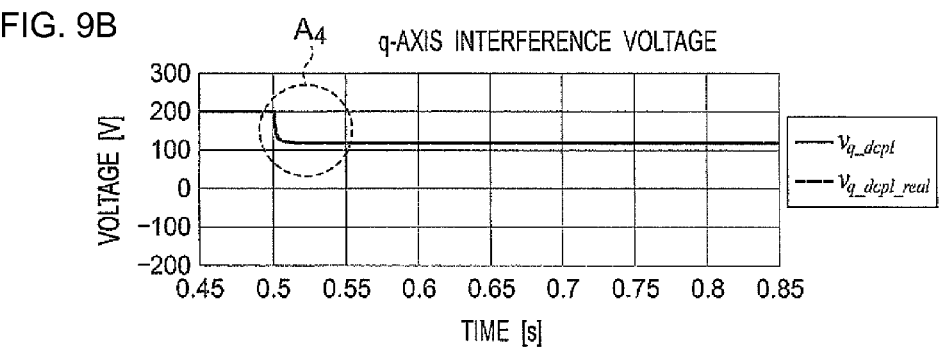
FIG. 9B is a graph illustrating q-axis voltage characteristics relative to time of the present invention.
Figure 9C:
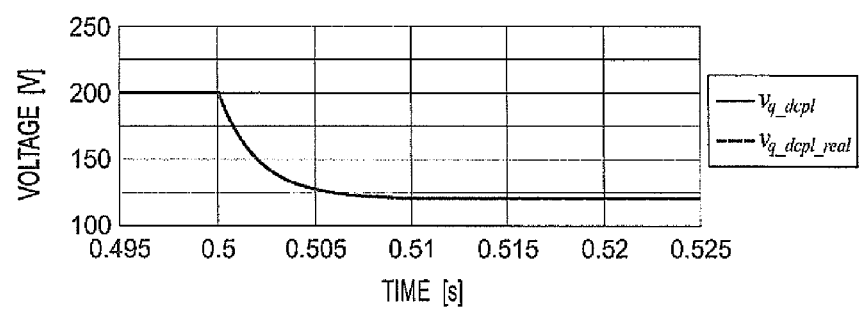
FIG. 9C is a graph illustrating q-axis voltage characteristics relative to time of the present invention, in the inverter control device of FIG. 1.

FIGS. 9A-9C are graphs illustrating response characteristics of a q-axis voltage, and FIG. 9A is a graph of current characteristics of Reference Example, FIG. 9B is a graph of current characteristics of the present invention, and FIG. 9C is a graph illustrating in enlarged dimension a portion circled by circle $A_4$ in FIG. 9B. In FIGS. 9A-9C, $V^*_{q\_dcpl}$ represents a q-axis non-interference voltage; and $V^*_{q\_dcpl\_real}$, the actual interference voltage. Also, Reference Example illustrates response characteristics of a control system without the phase compensation being performed by the non-interference phase compensator 17, in the current control system of FIG. 1.

As illustrated in FIG. 9A, in Reference Example, the non-interference voltage and the actual interference voltage do not coincide with each other due to being affected by the phase compensation performed by the stability compensator 16, and thus a stationary error occurs between the q-axis non-interference voltage and the q-axis interference voltage.

Meanwhile, as illustrated in FIGS. 9B and 9C, in the embodiment, the non-interference phase compensator 17 compensates for the influence of the phase compensation by the stability compensator 16 to thus eliminate the phase difference between the non-interference voltage and the interference voltage, and there is no error between the q-axis non-interference voltage and the q-axis interference voltage, so that the q-axis interference voltage coincides with the q-axis non-interference voltage.

Figure 10:
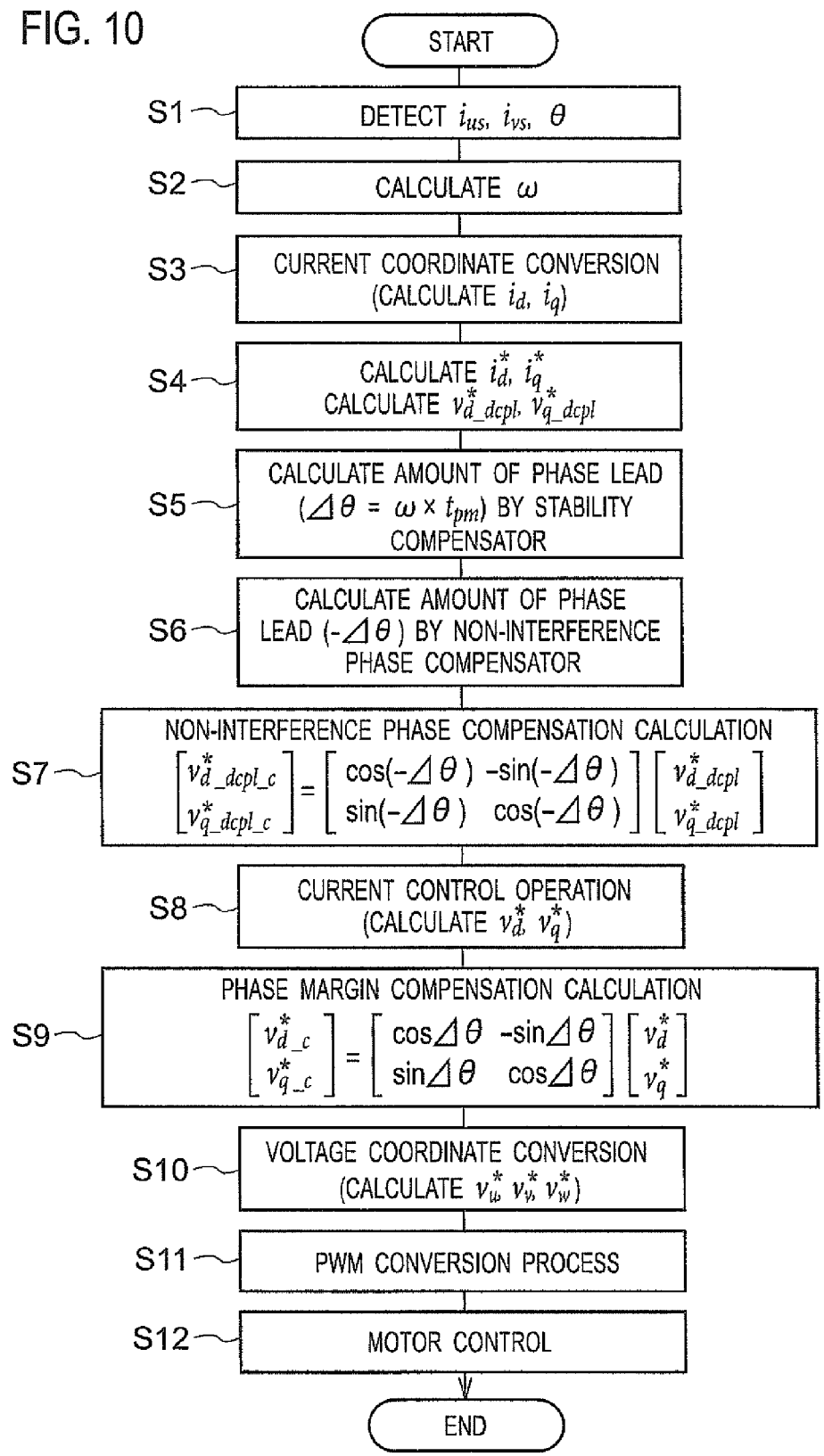
FIG. 10 is a flowchart illustrating a control procedure performed by the inverter control device of FIG. 1.

Next, description will be given with reference to FIG. 10 with regard to a control procedure for the feedback control performed by the inverter control device of the embodiment. FIG. 10 is a flowchart illustrating the control procedure performed by the inverter control device of the embodiment.

At step S1, the phase current ($i_{us}$, $i_{vs}$) is detected via the A/D converter 13 from the phase current ($i_u$, $i_v$) detected by the current sensor 7, and the pulse counter 14 counts the pulses outputted from the magnetic pole position detector 9 thereby to detect the detection value ($\theta$). At step S2, the rotation speed calculation unit 11 calculates the angular frequency (ω) of the motor 8. At step S3, the coordinate converter 10 performs coordinate conversion to convert the phase current ($i_{us}$, $i_{vs}$) into the d-q axes current ($i_d$, $i_q$).

At step S4, the d-q axes current command value ($i^*_d$, $i^*_q$) and the d-q axes non-interference voltage command value ($V^*_{d\_dcpl}$, $V^*_{q\_dcpl}$) corresponding to the externally inputted torque command value (T*), the angular frequency (ω) and the voltage ($V^*_{dc}$) are calculated by referring to the map stored in the current/voltage map 1.

At step S5, the stability compensator 16 calculates the amount of phase lead (Δθ) by multiplying the phase compensation time ($t_{pm}$) and the angular frequency (ω) together. At step S6, the non-interference phase compensator 17 calculates the angle of phase lead (−Δθ).

At step S7, the non-interference phase compensator 17 performs calculation to compensate for the phase of the d-q axes non-interference voltage command value, by performing the rotating coordinate conversion of the d-q axes non-interference voltage command value ($V^*_{d\_dcpl}$, $V^*_{q\_dcpl}$) to delay the phase by the amount of phase lead (Δθ) (or advance the phase by the amount of phase lead (−Δθ)).

At step S8, the current controller 2 passes the post-compensation d-q axes non-interference voltage command value ($V^*_{d\_dcpl\_c}$, $V^*_{q\_dcpl\_c}$) obtained at step S7 through the LPF 12 thereby to calculate the voltage command value ($V^*_{d\_dcpl\_flt}$, $V^*_{q\_dcpl\_flt}$), and performs the PI control operations based on the deviation of the d-q axes current ($i_d$, $i_q$) from the d-q axes current command value ($i^*_d$, $i^*_q$) thereby to calculate the d-q axes follow-up voltage command value ($V^*_{d\_FB}$, $V^*_{q\_FB}$). Then, the current controller 2 adds the voltage command value ($V^*_{d\_dcpl\_flt}$, $V^*_{q\_dcpl\_flt}$) and the d-q axes follow-up voltage command value ($V^*_{d\_FB}$, $V_{q\_FB}$) thereby to calculate the d-q axes voltage command value ($V^*_d$, $V^*_q$).

At step S9, the stability compensator 16 performs calculation to compensate for the phase margin, by performing the rotating coordinate conversion of the d-q axes voltage command value ($V^*_d$, $V^*_q$) to advance the phase by the amount of phase lead (Δθ).

At step S10, the post-compensation d-q axes voltage command value ($V^*_{d\_c}$, $V^*_{q\_c}$) as a calculated result obtained at step S9 is subjected to the coordinate conversion by the amount of phase (θ') outputted from the waste time compensator 15 thereby to calculate the voltage command value ($V^*_u$, $V^*_v$, $V^*_w$). Then, at step S11, the PWM converter 4 performs PWM conversion to convert the voltage command value ($V^*_u$, $V^*_v$, $V^*_w$) into the driving signal ($D^*_{uu}$, $D^*_{ul}$, $D^*_{vu}$, $D^*_{vl}$, $D^*_{wu}$, $D^*_{wl}$). At step S12, the inverter 6 is subjected to switching control based on the driving signal thereby to drive the motor 8, and then the control of the embodiment comes to an end.

As described above, in the embodiment, the amount of phase lead (Δθ) is calculated based on the phase compensation time ($t_{pm}$) and the angular frequency (ω) set in order to obtain a predetermined stabilized phase margin, and the command value is compensated for so as to advance the phase based on the characteristics inherent in the motor 8 according to the amount of phase lead (Δθ), and the phase of the d-q axes non-interference voltage command value is compensated for by the same amount of compensation as the amount of phase lead (Δθ) in the opposite direction to the phase compensated for by the amount of phase lead (Δθ). This enables suppressing a reduction in the phase margin caused by the characteristics inherent in the motor 8, thus achieving the inverter control device as a stable control system. Also, the embodiment can ensure the phase margin while reducing a phase lag in a low-frequency region and can suppress a gain reduction in a high-frequency region, thus enabling omission of readjustment of the phase margin or the gain margin. Also, the embodiment eliminates the phase difference between the interference voltage and the non-interference voltage caused by the compensation of the phase margin reduced due to the characteristics inherent in the motor 8, thus enabling an improvement in the current response characteristics.

Also, in the embodiment, the non-interference phase compensator 17 performs the phase compensation to compensate for the phase difference caused by the waste time for the current detection by the current sensor 7. Thereby, in the embodiment, compensation is provided by the amount of compensation corresponding to the phase difference caused by the waste time for the current detection, and thus, at the occurrence of the waste time for the current detection, compensation can be provided for the phase difference between the interference voltage and the non-interference voltage affected by the phase compensation performed by the stability compensator 16.

Also, in the embodiment, the amount of phase lead (Δθ) is calculated by multiplying the phase compensation time ($t_{pm}$) and the angular frequency (ω) together. Thus, even if the angular frequency changes according to the state of the motor 8 after the phase compensation time ($t_{pm}$) has been set to a fixed value, variations in the phase margin can be suppressed, so that the stable control system can be achieved.

Also, in the embodiment, the stability compensator 16 stores the table which associates the angular frequency (ω), the torque command value (T*), the temperature of the motor 8, or the input voltage ($V_{dc}$) to the inverter 6 with the phase compensation time ($t_{pm}$). The phase margin changes according to an inductance of the motor 8 or winding resistance affected by the current of the motor 8 or the magnitude of magnetic flux, besides the angular frequency (ω). Also, even under the same torque, maximum efficiency current conditions for the inverter control device of the embodiment change according to the voltage of the battery 5. In the embodiment, therefore, the phase compensation time ($t_{pm}$) is set according to the angular frequency (ω), the torque command value (T*), the temperature of the motor 8, or the input voltage ($V_{dc}$) to the inverter 6, as an operating point, and thereby, the control system can be stabilized even if there is a change in characteristics of the control system.

In the embodiment, it is not necessarily required that the table stored in the stability compensator 16 be the table which associates the angular frequency (ω), the torque command value (T*), the temperature of the motor 8, and the input voltage ($V_{dc}$) to the inverter 6 with the phase compensation time ($t_{pm}$), and any table will do, provided only that the table associates at least one of the values of the angular frequency (ω), the torque command value (T*), the temperature of the motor 8, and the input voltage ($V_{dc}$) to the inverter 6 with the phase compensation time ($t_{pm}$). Also, the table stored in the stability compensator 16 may associate the current of the motor 8 with the phase compensation time ($t_{pm}$).

Figure 11:
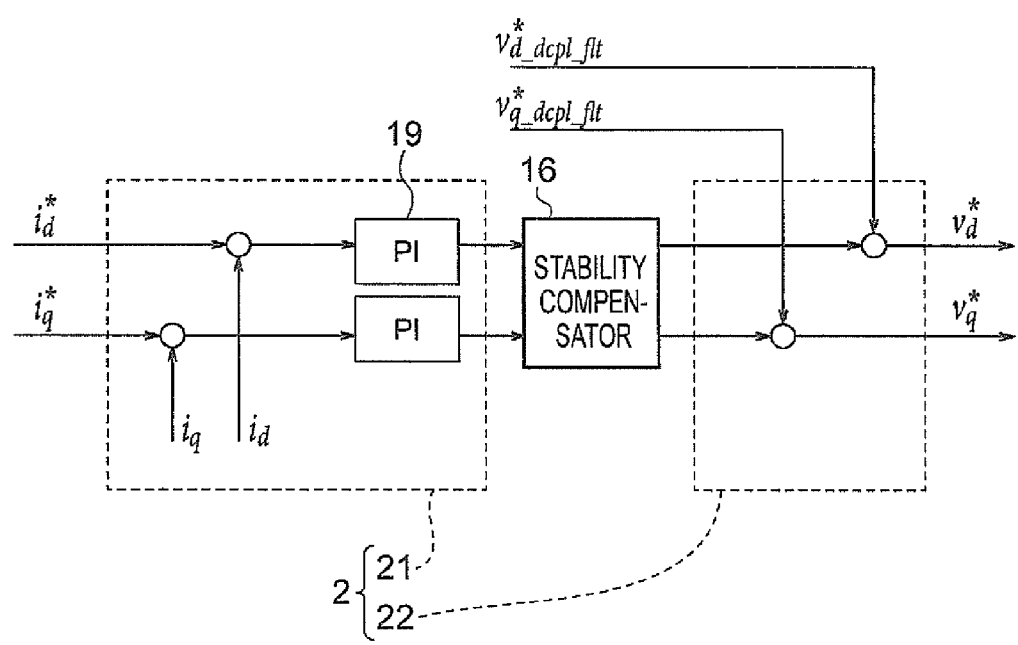
FIG. 11 is a block diagram of the current controller and the stability compensator according to Modification of the inverter control device of FIG. 1.

Also, in the embodiment, as illustrated in FIG. 11, the stability compensator 16 may be provided between a current control unit 21 and a non-interference control unit 22 which form the current controller 2, thereby to perform phase compensation so as to advance the d-q axes voltage command value according to the amount of phase lead (Δθ). FIG. 11 is a block diagram of the current controller 2 and the stability compensator 16 in Modification of the inverter control device of the embodiment. The current control unit 21 causes the PI controller 19 to perform feedback control on the d-q axes current ($i_d$, $i_q$) so that the d-q axes current ($i_d$, $i_q$) follows the d-q axes current command value ($i^*_d$, $i^*_q$), and to output the command value to the stability compensator 16, which then outputs the post-compensation command value compensated for by the stability compensator 16 to the non-interference control unit 22, which then receives inputs of the voltage command value ($V^*_{d\_dcpl\_flt}$, $V^*_{q\_dcpl\_flt}$) and the post-compensation command value, performs control operations on the inputs, and outputs the d-q axes voltage command value ($V^*_d$, $V^*_q$) to the coordinate converter 3.

Thereby, in Modification of the present invention, a d-q axes follow-up command value to cause the d-q axes current to follow the d-q axes current command value is calculated, and the d-q axes voltage command value is calculated based on the d-q axes follow-up voltage command value compensated for by the stability compensator 16 and the post-compensation d-q axes non-interference voltage command value compensated for by the non-interference phase compensator. Thus, Modification eliminates the phase difference between the interference voltage and the non-interference voltage caused by the compensation of the phase margin reduced due to the characteristics inherent in the motor 8, thus enabling an improvement in the current response characteristics.

In Modification of the embodiment, the rotating coordinate conversion by the stability compensator 16 (or the compensation by the amount of phase lead ($\Delta\theta$)) and the rotating coordinate conversion by the coordinate converter 3 may be synthesized so that the coordinate converter 3 performs a two-phase to three-phase conversion process by $\theta''(\theta'+\Delta\theta)$. Thereby, Modification can keep the response characteristics of the embodiment.

In the embodiment, the stability compensator 16 compensates for the phase of the d-q axes voltage command value ($V^*_d$, $V^*_q$) by the amount of phase lead ($\Delta\theta$); however, the stability compensator 16 may be provided between the current controller 2 and the coordinate converter 10 thereby to compensate for the detection value from the current sensor 7.

The current controller 2 corresponds to "command value calculator" according to the present invention; the stability compensator 16, "phase compensator"; the PWM converter 4, "inverter controller"; the magnetic pole position detector 9, the pulse counter 14 and the rotation speed calculation unit 11, "motor rotation speed detector"; the current/voltage map 1, "d-q axes non-interference voltage command value calculator"; the non-interference phase compensator 17 and the non-interference voltage control unit 18, "reverse phase compensator"; and the current sensor 7, "current detector."

[Second Embodiment]

Figure 12:
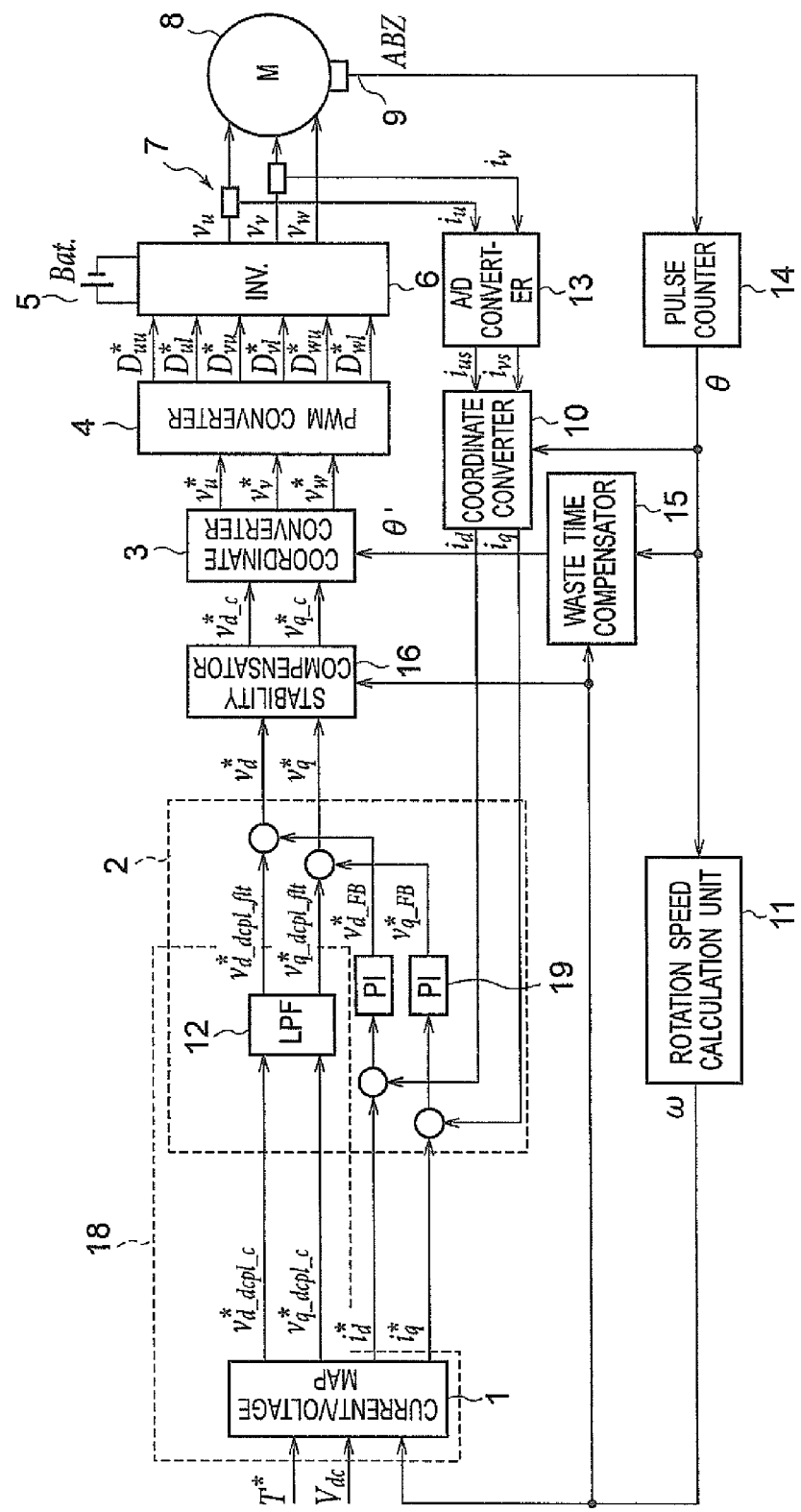
FIG. 12 is a block diagram of an inverter control device according to another embodiment of the present invention.

FIG. 12 is a block diagram illustrating an inverter control device according to another embodiment of the present invention. The second embodiment is different from the above-mentioned first embodiment in that the non-interference phase compensator 17 is omitted from the non-interference voltage control unit 18. The remaining configuration is the same as that of the above-mentioned first embodiment, the description of which is hereby incorporated herein by reference, as appropriate.

As illustrated in FIG. 12, the non-interference voltage control unit 18 includes the current/voltage map 1 and the LPF 12. The current/voltage map 1 stores the map for output of the d-q axes current command value ($i^*_d$, $i^*_q$) and the d-q axes non-interference voltage command value ($V^*_{d\_dcpl}$, $V^*_{q\_dcpl}$), using the torque command value ($T^*$), the angular frequency ($\omega$), and the voltage ($V_{dc}$) as the indexes, as is the case with the first embodiment; however, a map for calculation of the d-q axes non-interference voltage is configured to calculate a value subjected to a rotating coordinate conversion process based on the angle of phase lead ($-\Delta\theta$).

In other words, map values of the current/voltage map 1 include compensation calculations by the non-interference phase compensator of the first embodiment. Thus, by referring to the map, the current/voltage map 1 calculates the d-q axes current command value ($i^*_d$, $i^*_q$) corresponding to the inputted torque command value ($T^*$), the angular frequency ($\omega$) and the voltage ($V^*_{dc}$), and further calculates the post-compensation d-q axes non-interference voltage command value ($V^*_{d\_dcpl\_c}$, $V^*_{q\_dcpl\_c}$) subjected to reverse rotating coordinate conversion by the angle of phase lead ($\Delta\theta$).

Figure 13:
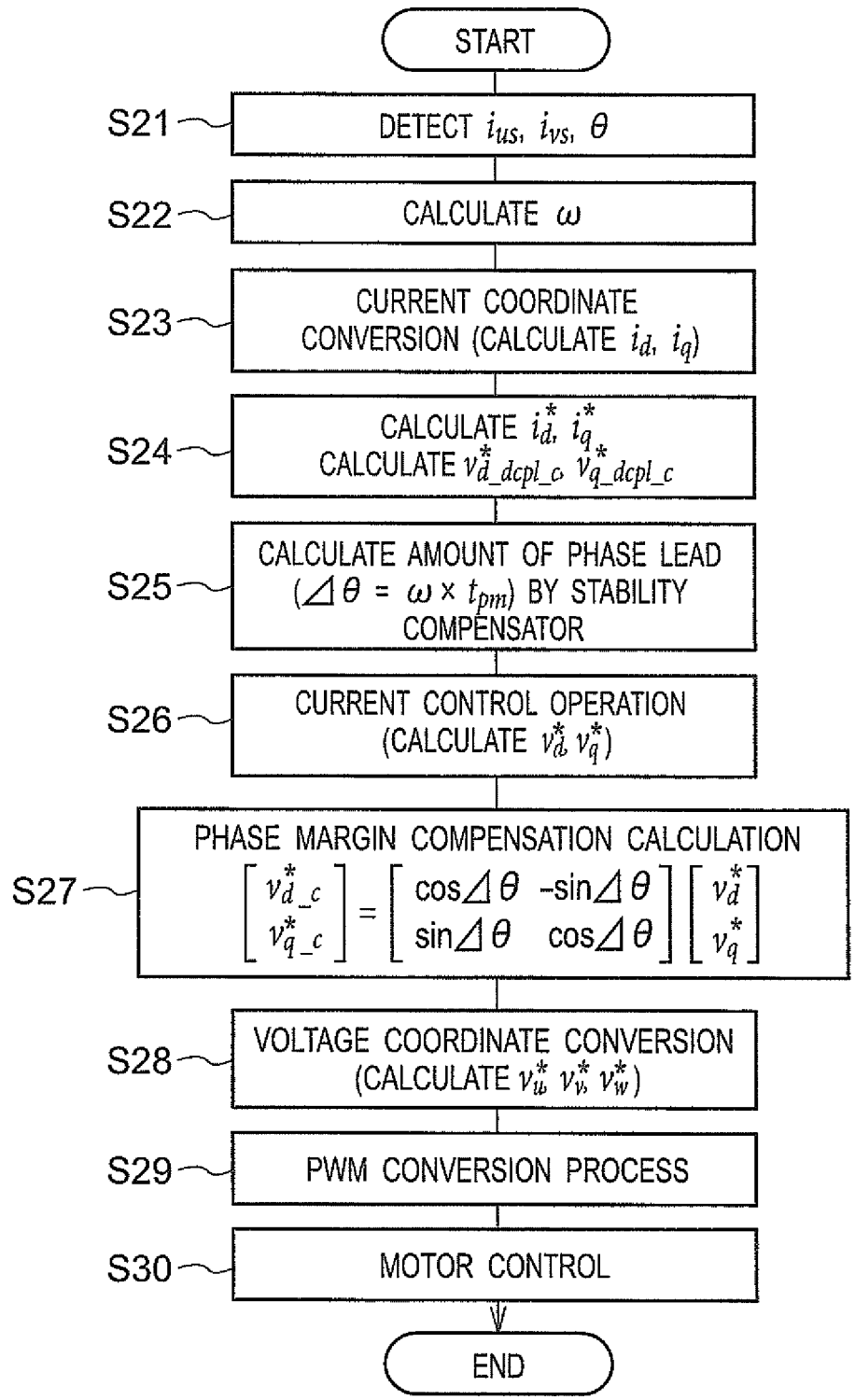
FIG. 13 is a flowchart illustrating a control procedure performed by the inverter control device of FIG. 12.

Next, description will be given with reference to FIG. 13 with regard to a control procedure for feedback control performed by the inverter control device of the second embodiment. FIG. 13 is a flowchart illustrating the control procedure performed by the inverter control device of the second embodiment. Since control operations of steps S21 to S23 and steps S26 to S30 are the same as those of steps S1 to S3 and steps S8 to S12 of FIG. 10, description will be omitted.

After the control operation of step S23, at step S24, the non-interference voltage control unit 18 calculates the d-q axes current command value ($i^*_d$, $i^*_q$) and the post-compensation d-q axes non-interference voltage command value ($V^*_{d\_dcpl\_c}$, $V_{q\_dcpl\_c}$) corresponding to the externally inputted torque command value ($T^*$), the angular frequency ($\omega$) and the voltage ($V^*_{dc}$) by referring to the map stored in the current/voltage map. At step S25, the stability compensator 16 calculates the amount of phase lead ($\Delta\theta$) by multiplying the phase compensation time ($t_{pm}$) and the angular frequency ($\omega$) together.

At step S26, the current controller 2 passes the post-compensation d-q axes non-interference voltage command value ($V^*_{d\_dcpl\_c}$, $V^*_{q\_dcpl\_c}$) obtained at step S24 through the LPF 12 thereby to calculate the voltage command value ($V^*_{d\_dcpl\_flt}$, $V_{q\_dcpl\_flt}$), and performs the PI control operations based on the deviation of the d-q axes current ($i_d$, $i_q$) from the d-q axes current command value ($i^*_d$, $i^*_q$) thereby to calculate the d-q axes follow-up voltage command value ($V^*_{d\_FB}$, $V^*_{q\_FB}$). Then, the current controller 2 adds the voltage command value ($V^*_{d\_dcpl\_flt}$, $V^*_{q\_dcpl\_flt}$) and the d-q axes follow-up voltage command value ($V^*_{d\_FB}$, $V^*_{q\_FB}$) thereby to calculate the d-q axes voltage command value ($V^*_d$, $V^*_q$).

In the second embodiment, as described above, the calculations by the map are performed to compensate for the phase of the interference voltage and the phase of the non-interference voltage command value by the same amount of compensation as the amount of phase lead ($\Delta\theta$) in the opposite direction to the phase of the stability compensator 16 using the amount of phase lead ($\Delta\theta$). Thus, the second embodiment eliminates the phase difference between the interference voltage and the non-interference voltage caused by the compensation of the phase margin reduced due to the characteristics inherent in the motor 8, thus enabling an improvement in the current response characteristics.

The current/voltage map 1 corresponds to the "reverse phase compensator" of the present invention.

[Third Embodiment]

Figure 14:
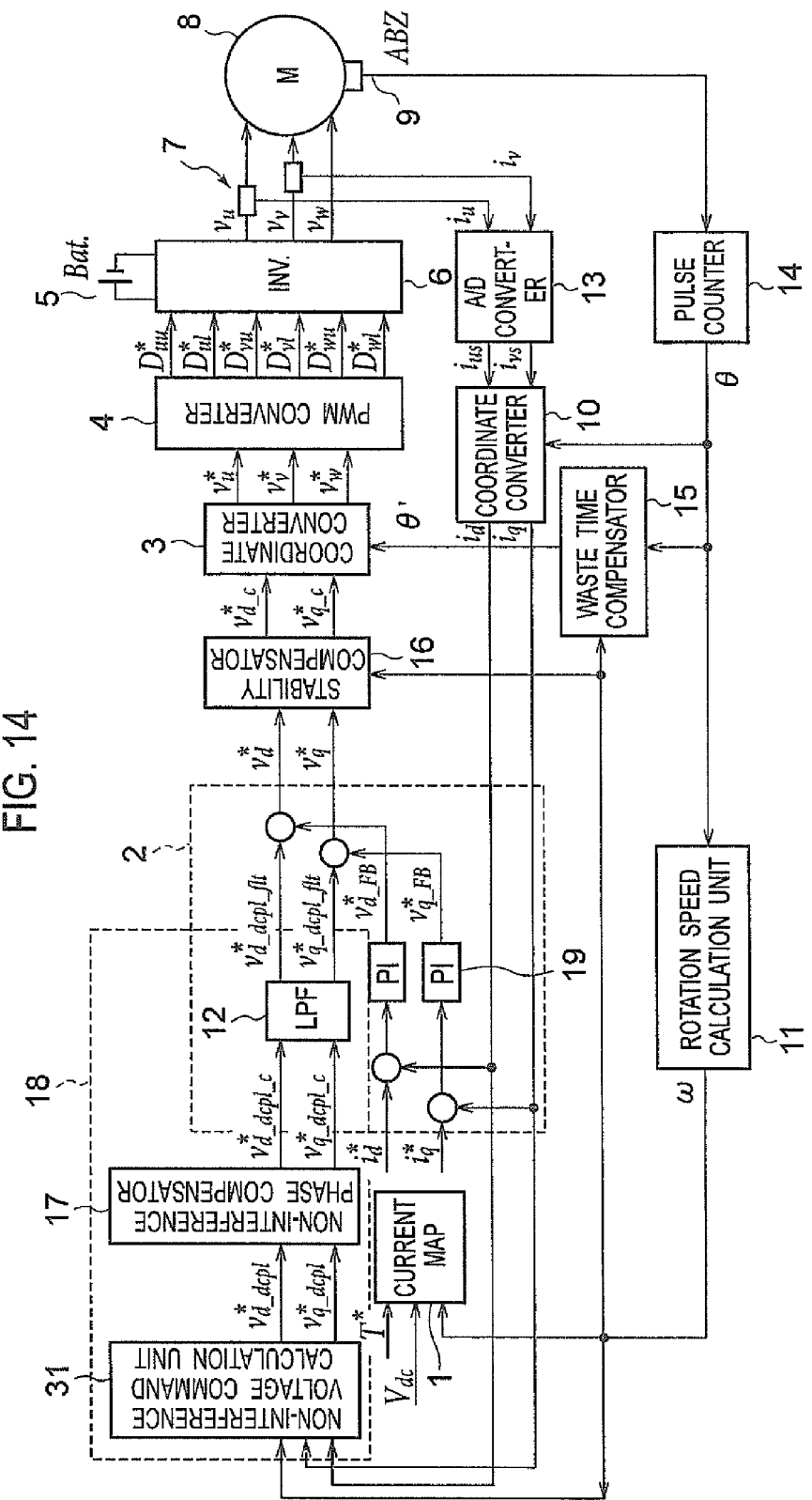
FIG. 14 is a block diagram of an inverter control device according to still another embodiment of the present invention.

FIG. 14 is a block diagram illustrating an inverter control device according to still another embodiment of the present invention. The third embodiment is different from the above-mentioned first embodiment in that a non-interference voltage command calculation unit 31 is provided. The remaining configuration is the same as that of the above-mentioned first embodiment, and the descriptions of the first and second embodiments are hereby incorporated herein by reference, as appropriate.

As illustrated in FIG. 14, the non-interference voltage control unit 18 includes the current/voltage map 1, the LPF 12, and the non-interference voltage command calculation unit 31. The non-interference voltage command calculation unit 31 calculates the d-q axes non-interference voltage command value ($V^*_{d\_dcpl}$, $V^*_{q\_dcpl}$), by using Equation (4), based on the inputted d-q axes current ($i_d$, $i_q$) and the angular frequency ($\omega$), and outputs the d-q axes non-interference voltage command value ($V^*_{d\_dcpl}$, $V^*_{q\_dcpl}$) to the non-interference phase compensator 17:

$$v_{d\_dcpl}^* = -\omega L_q i_q$$

$$v_{q\_dcpl}^* = \omega L_d i_d + \omega \Phi_a \quad (4)$$

where $\Phi_a$ represents the strength of magnetic flux of a magnet of the motor 8; and $L_d$, $L_q$, the inductances of the d and q axes.

Next, description will be given with reference to FIG. 15 with regard to a control procedure for feedback control performed by the inverter control device of the third embodiment. FIG. 15 is a flowchart illustrating the control procedure performed by the inverter control device of the third embodiment. Since control operations of steps S31 to S33 and steps S36 to S43 are the same as those of steps S1 to S3 and steps S5 to S12 of FIG. 10, description will be omitted.

After the control operation of step S33, at step S34, the d-q axes current command value ($i^*_d$, $i^*_q$) corresponding to the externally inputted torque command value (T*), the angular frequency ($\omega$) and the voltage ($V^*_{dc}$) is calculated by referring to the map stored in the current/voltage map 1.

At step S35, the non-interference voltage command calculation unit 31 calculates the d-q axes non-interference voltage command value ($V^*_{d\_dcpl}$, $V^*_{q\_dcpl}$), by using Equation (4), based on the d-q axes current ($i_d$, $i_q$) and the angular frequency ($\omega$), and outputs the d-q axes non-interference voltage command value ($V^*_{d\_dcpl}$, $V^*_{q\_dcpl}$) to the non-interference phase compensator 17.

Thereby, in the third embodiment, the non-interference voltage command calculation unit 31 performs calculations to compensate for the phase of the interference voltage and the phase of the non-interference voltage command value by the same amount of compensation as the amount of phase lead ($\Delta\theta$) in the opposite direction to the phase of the stability compensator 16 using the amount of phase lead ($\Delta\theta$). Thus, the third embodiment eliminates the phase difference between the interference voltage and the non-interference voltage caused by the compensation of the phase margin reduced due to the characteristics inherent in the motor 8, thus enabling an improvement in the current response characteristics.

The invention claimed is:

1. An inverter control device comprising:
   an inverter configured to convert DC power inputted from a DC power supply into AC power and supply the AC power to a motor;
   a command value calculator configured to calculate a command value for an AC voltage outputted from the inverter, based on a detection value for an AC current;
   a phase compensator configured to compensate for a phase of the command value or the detection value;
   an inverter controller configured to control the inverter, based on the command value compensated for by the phase compensator;
   a motor rotation speed detector configured to detect a rotation speed of the motor;
   a d-q axes non-interference voltage command value calculator configured to calculate a d-q axes non-interference voltage command value to cancel out interference voltages interfering with each other between d and q axes, and to output the d-q axes non-interference voltage command value to the command value calculator; and
   a reverse phase compensator configured to compensate for a phase according to the amount of compensation of the phase compensated for by the phase compensator,
   wherein
   the phase compensator calculates the amount of phase lead based on the rotation speed and a phase compensation time set in order to obtain a predetermined phase margin, and compensates for a phase based on characteristics inherent in the motor, by the amount of phase lead, and
   the reverse phase compensator compensates for a phase of the d-q axes non-interference voltage command value by the same amount of compensation as the amount of phase lead in the opposite direction to the phase compensated for by the phase compensator.

2. The inverter control device according to claim 1, further comprising a current detector configured to detect a phase current of the motor,
   wherein the amount of compensation by the reverse phase compensator is equivalent to at least a phase difference caused by a waste time for current detection by the current detector.

3. The inverter control device according to claim 1, further comprising a d-q axes current command value calculator configured to calculate a d-q axes current command value as a command value for the AC current, based on a torque command value for the motor and the rotation speed,
   wherein
   the phase compensator compensates for a d-q axes follow-up voltage command value, and
   the command value calculator calculates the d-q axes follow-up voltage command value such that a d-q axes current as the detection value for the AC current follows the d-q axes current command value, and calculates the command value for the AC voltage, based on the d-q axes follow-up voltage command value compensated for by the phase compensator and the d-q axes non-interference voltage command value compensated for by the reverse phase compensator.

4. The inverter control device according to claim 1, wherein the phase compensator calculates the amount of phase lead by multiplying the phase compensation time and the rotation speed together.

5. The inverter control device according to claim 1, wherein the phase compensator stores a map which associates at least one of values of the rotation speed, the current of the motor, the externally inputted torque command value, a temperature of the motor, and an input voltage to the inverter with the phase compensation time.

6. An inverter control method comprising:
   converting DC power inputted from a DC power supply into AC power with an inverter, and supplying the AC power to a motor;
   detecting an AC current outputted from the inverter;
   calculating a command value for an AC voltage outputted from the inverter, based on a detection value detected by the detecting step;
   compensating for a phase of the command value or the detection value;
   controlling the inverter, based on the command value compensated for by the phase compensating step;
   detecting a rotation speed of the motor;
   calculating a d-q axes non-interference voltage command value to cancel out interference voltages interfering with each other between d and q axes; and reverse compensating for a phase according to the amount of compensation of the phase compensated for by the phase compensating step, wherein:

calculating the command value includes calculating the command value for the AC voltage, based on the d-q axes non-interference voltage command value, compensating for the phase includes calculating the amount of phase lead based on the rotation speed and a phase compensation time set in order to obtain a predetermined phase margin, and compensating for a phase based on characteristics inherent in the motor, by the amount of phase lead, and reverse compensating includes compensating for a phase of the d-q axes non-interference voltage command value by the same amount of compensation as the amount of phase lead in the opposite direction to the phase compensated for by the compensating for the phase step.

* * * * *